(12) United States Patent
Fonville et al.

(10) Patent No.: US 8,342,538 B2
(45) Date of Patent: Jan. 1, 2013

(54) GASKET-END FEATURE FOR SEALING A T-JOINT ASSEMBLY

(75) Inventors: Carl E. Fonville, Ann Arbor, MI (US); Eric A. Nordling, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 12/837,549

(22) Filed: Jul. 16, 2010

(65) Prior Publication Data

US 2012/0014746 A1 Jan. 19, 2012

(51) Int. Cl.
*F16J 15/02* (2006.01)
(52) U.S. Cl. .......... 277/630; 277/637; 277/641
(58) Field of Classification Search .......... 277/628, 277/630, 637, 639, 641, 643–644
See application file for complete search history.

(56) References Cited

U.S. PATENT DOCUMENTS

| 6,003,878 A * | 12/1999 | Noble et al. ............ 277/596 |
| 6,173,966 B1 * | 1/2001 | Noble et al. ............ 277/596 |
| 2002/0117812 A1 * | 8/2002 | Mori et al. ............ 277/591 |

* cited by examiner

*Primary Examiner* — Vishal Patel
(74) *Attorney, Agent, or Firm* — Quinn Law Group, PLLC

(57) ABSTRACT

A t-joint assembly includes a gasket having first and second ends, and a substantially elongated body having a profile. The first end includes an enlarged tapered section having a distal tip and a force-transfer surface disposed substantially perpendicular to the body. The assembly also includes a first component having a channel with a profile and a reaction surface configured to respectively complement the profile and accept the force-transfer surface of the gasket. The first component also has a first sealing surface arranged substantially parallel to the reaction surface, and a second sealing surface arranged substantially perpendicular to the reaction surface. The t-joint assembly additionally includes second and third components, each having a sealing surface. Inserting the gasket into the channel and assembling the three components compresses the gasket against the channel, and the tip of the gasket against the reaction surface, to thereby seal the t-joint.

12 Claims, 5 Drawing Sheets

GASKET-END FEATURE FOR SEALING A T-JOINT ASSEMBLY

TECHNICAL FIELD

The invention relates to a gasket-end feature for sealing a t-joint assembly.

BACKGROUND

A gasket is a mechanical seal that fills the space between mating surfaces, generally to prevent leakage of a fluid from or into the joined objects while the gasket is under compression. Gaskets permit "less-than-perfect" mating surfaces on machine parts to be joined without allowing leakage by using a gasket to fill surface irregularities. Gaskets are commonly produced from sheet or molded materials such as paper, rubber, silicone, or a plastic polymer. Some gaskets require an application of sealant directly to the gasket surface to function properly.

In situations where a joint between two mating components is pressurized, sealing of such a joint becomes even more challenging. Additionally, in such pressurized joints, any unintended fluid leakage may lead to functional failure of a system thus being sealed. Typically, such leakage may cause additional inconvenience by creating a fluid spill that necessitates a clean-up. Design and selection of a gasket for a particular application may thus prove critical to the reliability of a subject system and to the satisfaction of the system's user.

SUMMARY

A t-joint assembly includes a gasket characterized by a height, having a first end and a second end, and having a substantially elongated body characterized by a profile and a width. The first end of the gasket includes a tapered section with a distal tip, and includes a force-transfer surface disposed substantially perpendicular to the body and having a width greater than the width of the body. The t-joint assembly also includes a first component having a channel characterized by a height, and by a profile configured to complement the profile of the gasket. The channel includes a reaction surface configured to accept the force-transfer surface of the gasket, a first sealing surface arranged substantially parallel to the reaction surface, and a second sealing surface arranged substantially perpendicular to the reaction surface. The t-joint assembly also includes a second component having a third sealing surface, and a third component having a fourth sealing surface. When the gasket is inserted into the channel and the second component is assembled with the first and third components, the third sealing surface compresses the height of the gasket against the channel, and the fourth sealing surface presses the tip of the gasket toward the reaction surface, to thereby seal the t-joint.

Insertion of the gasket into the channel and subsequent assembly of the first component with the second and third components may initially cause the height of the gasket to protrude past the height of the channel such that the gasket seals against the second component. The above assembly operation may additionally cause the tip of the gasket to protrude past the first sealing surface of the first component such that the tip of the gasket seals against the third component. The tip of the gasket may protrude past the first sealing surface of the first component and the height of the gasket may protrude past the height of the channel sufficiently to seal the assembly at least up to a pressure of 220 PSI.

The enlarged tapered section may be characterized by a substantially triangular head, such that the distal tip is a peak of the triangular head, the force-transfer surface is a base of the triangular head, and the base is arranged opposite to the peak.

The gasket may be formed from a compliant material. The t-joint may be designed to come into contact with a fluid, and, in such a case, the gasket material is selected based on its chemical resistance, i.e., being inert, to the fluid.

During assembly of the t-joint, after the gasket is inserted into the channel, but prior to the first component being assembled with the second component, the tip of the gasket may be configured to not protrude past the first sealing surface of the first component.

A method of sealing a t-joint according to the above is also disclosed. During assembly of the t-joint, the gasket is inserted into the channel of the first component, the body of the gasket is compressed against the channel by the second component, and then the tip of the gasket is compressed by the third component to seal the joint.

The above features and advantages and other features and advantages of the present invention are readily apparent from the following detailed description of the best modes for carrying out the invention when taken in connection with the accompanying drawings.

DETAILED DESCRIPTION

Figure 1:
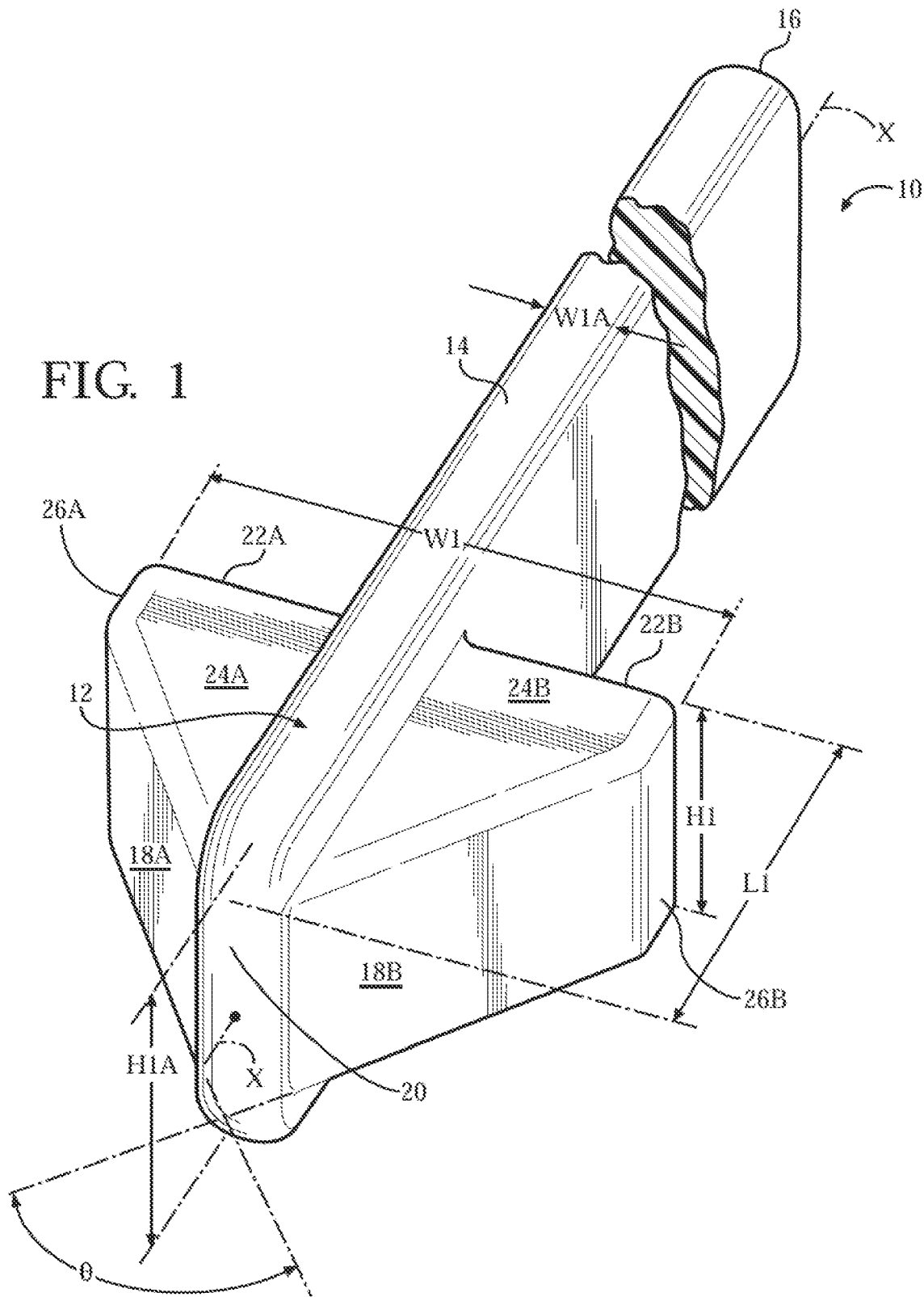
FIG. 1 is a perspective view of a gasket for use in sealing a t-joint.

Referring to the drawings, wherein like reference numbers refer to like components, FIG. 1 shows a perspective view of a gasket 10. Gasket 10 is adapted to be inserted into an appropriate channel of a specifically designed receiving component for sealing a t-joint. The shape of gasket 10 is essentially symmetrical about a longitudinal axis X. Gasket 10 is preferably formed from a compliant, spring-like material, such as rubber or silicone. The material for gasket 10 is preferably chosen to be chemically resistant to a particular fluid, such as a lubricant or a coolant, that the t-joint is intended to come in contact with and/or retain.

Gasket 10 includes a first end 12, an elongated body 14, and a second end 16. The first end 12 has a generally triangular or arrow-shaped head, and includes a tapered section that has a surface 18A and a surface 18B. Surface 18A is disposed at an angle θ with respect to surface 18B, such that surfaces 18A and 18B converge at a tip 20, thereby forming a peak of the triangular head. Although surfaces 18A and 18B are shown as being substantially straight, nothing precludes such surfaces from having a different profile, as understood by those skilled in the art. The tapered section is specifically included to generate efficient force transfer from tip 20 to the channel of the receiving component for effectively sealing the subject t-joint.

The first end 12 also includes surfaces 22A and 22B. Surfaces 22A and 22B form the base of the triangular head having a width W1. First end 12 is characterized by a length L1 from tip 20 to surfaces 22A and 22B. The first end 12 is also characterized by surfaces 24A and 24B that are disposed substantially perpendicular to surfaces 22A and 22B, respectively. Surfaces 24A and 24B are also repeated on the back side of first end 12, consistent with the symmetry of the gasket 10 about axis X. Each of the surfaces 22A and 22B is characterized by a height H1. The body 14 is characterized by a width W1A and a height H1A. Width W1 is greater than width W1A by at least a factor of 2:1, such that surfaces 24A and 24B together generate a force-transfer surface, i.e., a surface arranged to transfer a force that is applied at tip 20. Body 14 extends into the first end 12 and culminates at the tip 20. Height H1A is greater than height H1, therefore the body protrudes above surfaces 24A and 24B. The first end 12 also includes surfaces 26A and 26B. Surfaces 26A and 26B are substantially perpendicular to surfaces 24A and 24B, respectively, in order to aid stability of the first end 12 when gasket 10 is inserted into the appropriate channel.

Figure 2:
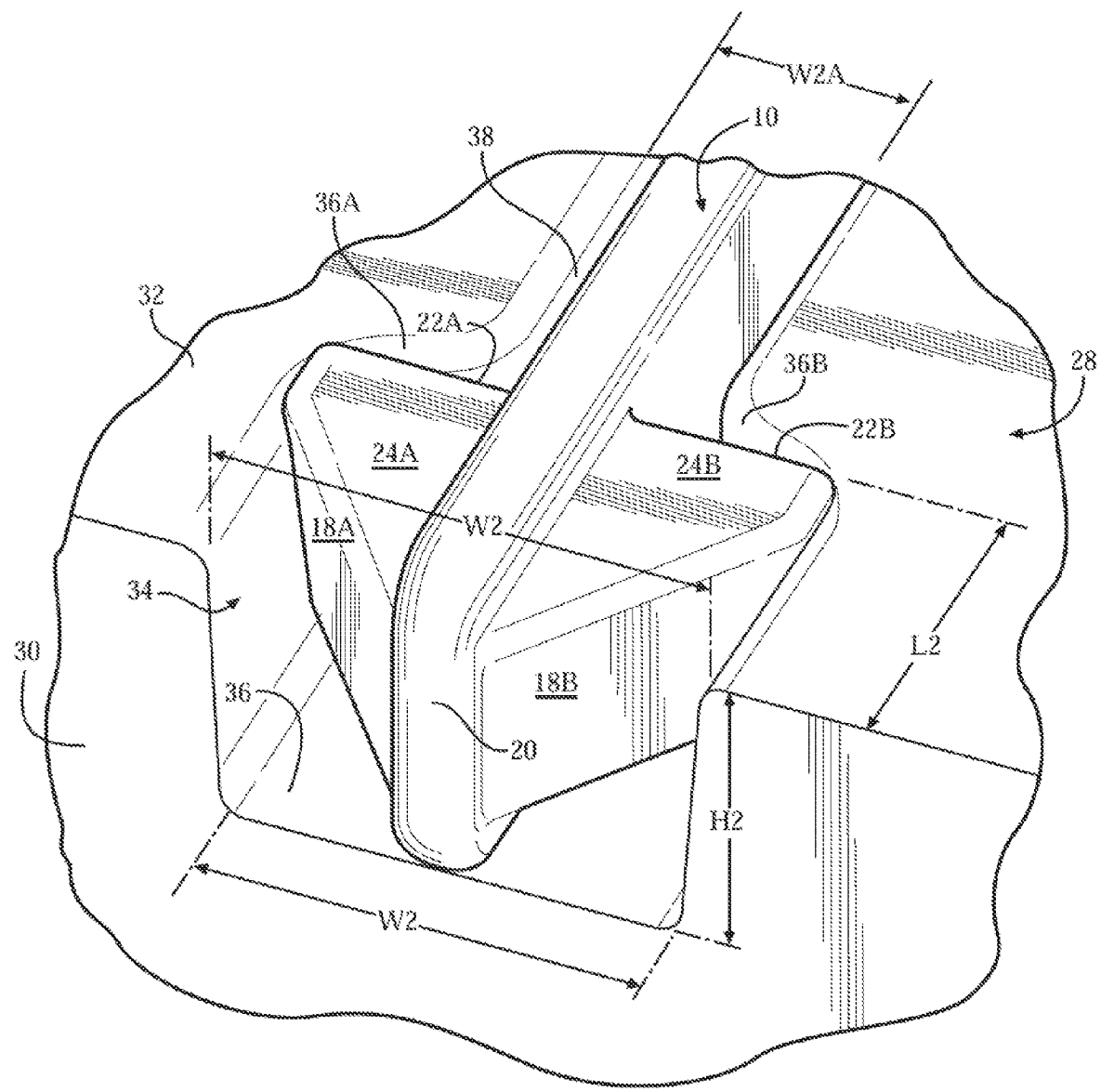
FIG. 2 is a perspective view of the gasket shown in FIG. 1 installed in a channel of a first component.

FIG. 2 depicts gasket 10 inserted into a first component 28 having a first sealing surface 30, a second sealing surface 32, and a channel 34. Specifically, gasket 10 is inserted into channel 34. Channel 34 includes a pocket 36 and a groove 38. Pocket 36 is configured to accept the first end 12 of gasket 10, while groove 38 is configured to accept the body 14. Pocket 36 is characterized by a width W2, a length L2, and a height H2. Width W2 is preferably equal to or slightly less than width W1 of gasket 10, such that upon insertion of first end 12 into the pocket, a tight or interference fit is generated between the gasket and the pocket. Length L2 is substantially equal to the length L1 of gasket 10. Height H2, on the other hand, is smaller than the height H1A of the gasket 10, such that body 14 protrudes beyond the height of the channel 34 when the gasket is initially inserted into first component 28.

Pocket 36 includes reaction surfaces 36A and 36B that are configured to accept the force-transfer surfaces 22A and 22B, respectively. Reaction surfaces 36A and 36B are arranged parallel to force-transfer surfaces 22A and 22B, such that a force that is applied at tip 20 is transferred through the first end 12 to first component 28. Groove 38 is characterized by a profile that is configured to substantially complement the profile of the body 14. Groove 38 is additionally characterized by a width W2A that is preferably greater than width W1A of the body 14, to thus permit insertion of gasket 10 into first component 28.

Figure 3:
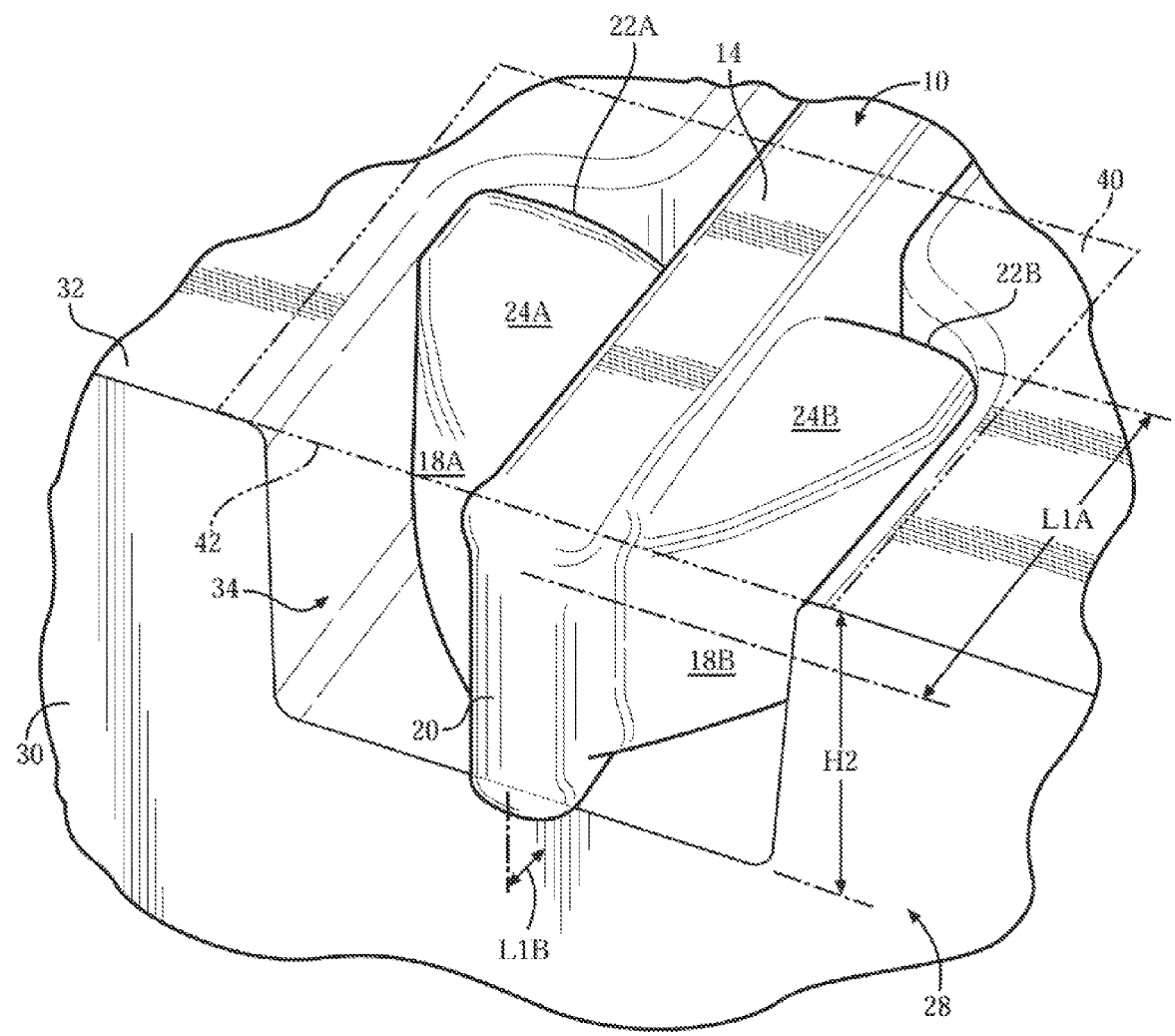
FIG. 3 is a perspective transparent view of the first component shown in FIG. 1 assembled with a second component.

FIG. 3 depicts first component 28 being mated with a second component 40 after the gasket 10 has been inserted into channel 34 of the first component. Second component 40 is schematically shown in two-dimensions as a plane, but as understood by those skilled in the art, the second component may adopt any shape or configuration appropriate for a particular application. Second component 40 is shown to present a substantially flat sealing surface 42 for contacting and sealing against gasket 10, specifically against the body 14. Because the height H1A is greater than the height H1, the gasket 10 is compressed by the sealing surface 42 against channel 34 for more effective sealing due to the compliant, spring-like gasket material.

Second component 40 may also be provided with a step (not shown) in the sealing surface 42 configured to fit into and/or substantially mimic the shape of the channel 34 to further compress gasket 10, as understood by those skilled in the art. The action of compressing the body 14 inside channel 34 deforms the entire gasket 10, and specifically compresses first end 12 height-wise, while expanding the first end in length, as depicted by length L1A. Additionally, the force-transfer surfaces 22A and 22B press against reaction surfaces 24A and 24B, thereby forcing tip 20 to extend away from the reaction surfaces. The result of such forced extension of tip 20 is that the tip ends up protruding beyond first sealing surface 30 of the first component 28 by a dimension L1B.

Figure 4:
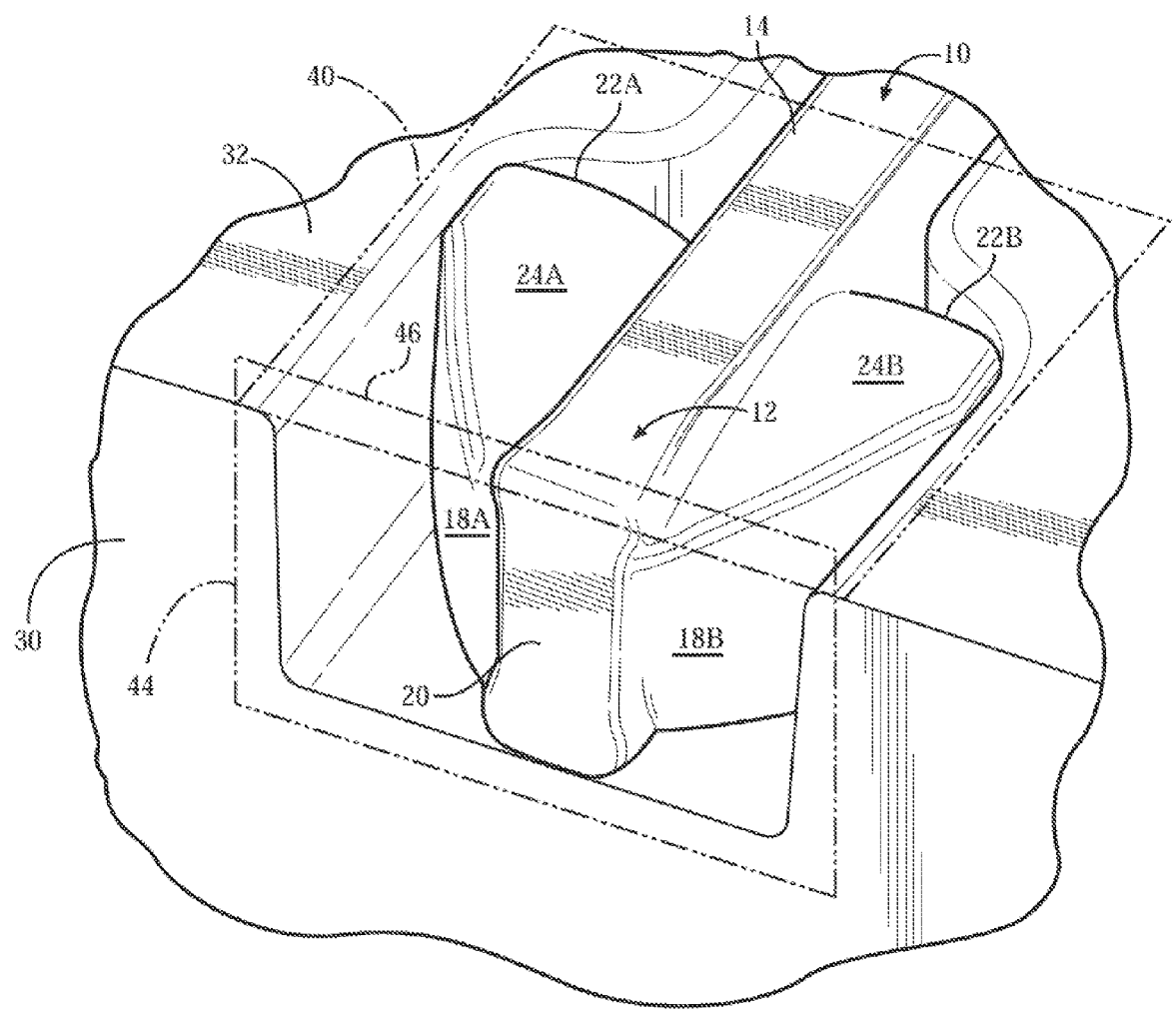
FIG. 4 is a perspective transparent view of a fully assembled t-joint.

FIG. 4 depicts the subassembly of first component 28, second component 40, and gasket 10, being mated with a third component 44. Third component 44 is schematically shown in two-dimensions as a plane, but as understood by those skilled in the art, the third component may adopt any shape or configuration appropriate for a particular application. Third component 44 is shown to present a substantially flat sealing surface 46 for contacting and sealing against gasket 10, specifically against the tip 20. Because tip 20 of the gasket 10 protrudes beyond first sealing surface 30 of the first component 28 by dimension L1B, sealing surface 46 of the third component 44 compresses first end 12 of the gasket for more effective sealing.

Third component 44 may also be provided with a step (not shown) in the sealing surface 46 configured to fit into and/or substantially mimic the shape of pocket 36 along the first sealing surface 30 to further compress gasket 10, as understood by those skilled in the art. By mating third component 44 with the subassembly of first component 28 and second component 40, the enclosure of gasket 10 becomes complete, and the t-joint is thereby fully sealed. The resultant compression of gasket 10 between components 28, 40, and 44 is sufficient to seal the t-joint from fluid leakage at least up to a pressure of 220 PSI.

Figure 5:
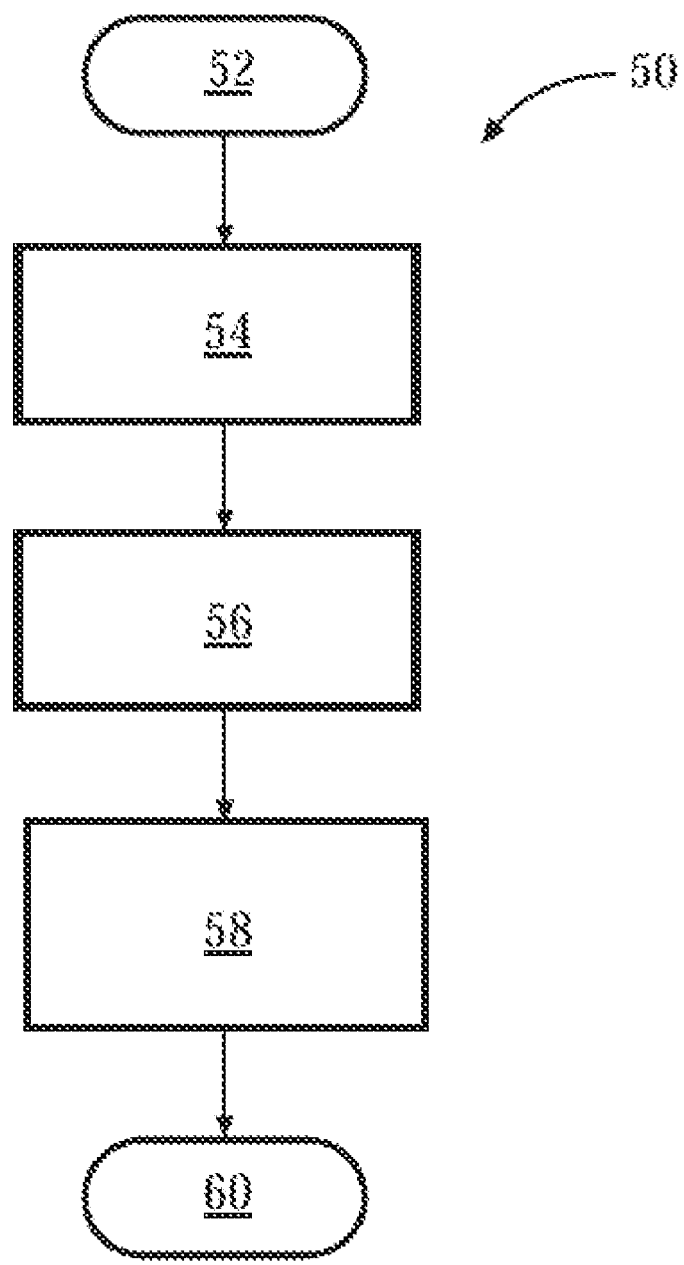
FIG. 5 is a flow chart illustrating a method of sealing a t-joint by using the gasket depicted in FIG. 1.

A method 50 of sealing a t-joint by using the gasket 10 is shown in FIG. 5, and described below with respect to FIGS. 1-4. The method commences in frame 52, wherein first component 28 is provided for use in the t-joint, and then proceeds to frame 54. In frame 54, gasket 10 is inserted into channel 34 of the first component 28, such that the force-transfer surfaces 22A and 22B of the gasket abut the reaction surfaces 36A and 36B of the first component. Following frame 54, the method continues to frame 56, where first component 28 is assembled with second component 40, such that the sealing surface 42 of the second component compresses gasket 10 against the channel 34. After frame 56, the method continues to frame 58, where third component 44 is assembled with the assembled first and second components 28, 40. In frame 58, the act of assembling the third component 44 causes the sealing surface 46 of the third component to drive the force-transfer surfaces 22A and 22B of the gasket 10 against the reaction surfaces 36A and 36B, respectively, and, as a result, to compress the gasket's tip 20. Method 50 concludes in frame 60, with the t-joint being fully sealed.

While the best modes for carrying out the invention have been described in detail, those familiar with the art to which this invention relates will recognize various alternative designs and embodiments for practicing the invention within the scope of the appended claims.

The invention claimed is:

1. A method of sealing a t-joint comprising:
assembling a gasket characterized by a height, having a first end and a second end, and having a substantially elongated body characterized by a profile and a width, wherein the first end includes a tapered section having a distal tip and a force-transfer surface disposed substantially perpendicular to the body, and having a width greater than the width of the body, with a first component having a channel characterized by a height, a profile configured to complement the profile of the gasket, a reaction surface configured to be abutted by the force-transfer surface, a first sealing surface arranged substantially parallel to the reaction surface, and a second sealing surface arranged substantially perpendicular to the reaction surface, such that the gasket is inserted in the channel and the force-transfer surface abuts the reaction surface;

the tapered section having a substantially triangular head, the distal tip is a peak of the triangular head, the force-transfer surface is a base of the triangular head, and the base is arranged opposite to the peak;

assembling the first component with a second component having a third sealing surface, such that the third sealing surface compresses the height of the gasket against the channel; and assembling a third component having a fourth sealing surface with the assembled first and second components, such that the fourth sealing surface presses the tip of the gasket toward the reaction surface to seal the t-joint.

2. The method of claim 1, wherein said inserting the gasket into the channel and assembling the first component with the second and third components causes the height of the gasket to protrude past the height of the channel such that the gasket seals against the second component, and causes the tip of the gasket to protrude past the first sealing surface of the first component such that the tip of the gasket seals against the third component.

3. The method of claim 2, wherein the tip of the gasket protruding past the first sealing surface of the first component and the height of the gasket protruding past the height of the channel are sufficient to seal the assembly up to a pressure of 220 PSI.

4. The method of claim 1, wherein the gasket is formed from a compliant material.

5. The method of claim 1, wherein the gasket comes into contact with a fluid, and the material is selected based on its chemical resistance to the fluid.

6. The method of claim 1, wherein after said inserting the gasket into the channel, but prior to said assembling the first component with the second component, the tip of the gasket does not protrude past the first sealing surface of the first component.

7. A t-joint assembly comprising:

a gasket characterized by a height, having a first end and a second end, and having a substantially elongated body characterized by a gasket profile and a gasket width, wherein the first end includes a tapered section having a width greater than the width of the body, a distal tip, and a force-transfer surface disposed substantially perpendicular to the body;

the tapered section having a substantially triangular head, the distal tip is a peak of the triangular head, the force-transfer surface is a base of the triangular head, and the base is arranged opposite to the peak;

a first component including a channel characterized by a channel height, and by a channel profile that complements the gasket profile, the channel having a reaction surface that accepts the force-transfer surface of the gasket, a first sealing surface arranged substantially parallel to the reaction surface, and a second sealing surface arranged substantially perpendicular to the reaction surface;

a second component having a third sealing surface; and a third component having a fourth sealing surface;

wherein: the gasket being inserted into the channel and the first component being assembled with the second and the third components, the sealing surface of the second component compresses the height of the gasket against the channel and the sealing surface of the third component presses the tip of the gasket toward the reaction surface, to thereby seal the t-joint.

8. The t-joint assembly of claim 7, wherein the gasket height protrudes past the height of the channel to seal the gasket against the second component, and the tip of the gasket protrudes past the first sealing surface of the first component to seal the gasket against the third component, when the gasket is inserted into the channel and the first component is assembled with the second and third components.

9. The t-joint assembly of claim 8, wherein the tip of the gasket protrudes past the first sealing surface of the first component and the height of the gasket protrudes past the height of the channel sufficiently to seal the assembly up to a pressure of 220 PSI.

10. The t-joint assembly of claim 7, wherein the gasket is formed from a compliant material.

11. The t-joint assembly of claim 7, wherein the gasket is configured to come into contact with a fluid, and the material is selected based on its chemical resistance to the fluid.

12. The t-joint assembly of claim 7, wherein after the gasket is inserted into the channel, but prior to when the first component is assembled with the second component, the tip of the gasket does not protrude past the first sealing surface of the first component.

\* \* \* \* \*